May 12, 1959
M. E. GUNNING
2,885,791
CELESTIAL NAVIGATION TRAINER
Filed Dec. 12, 1955
4 Sheets-Sheet 3
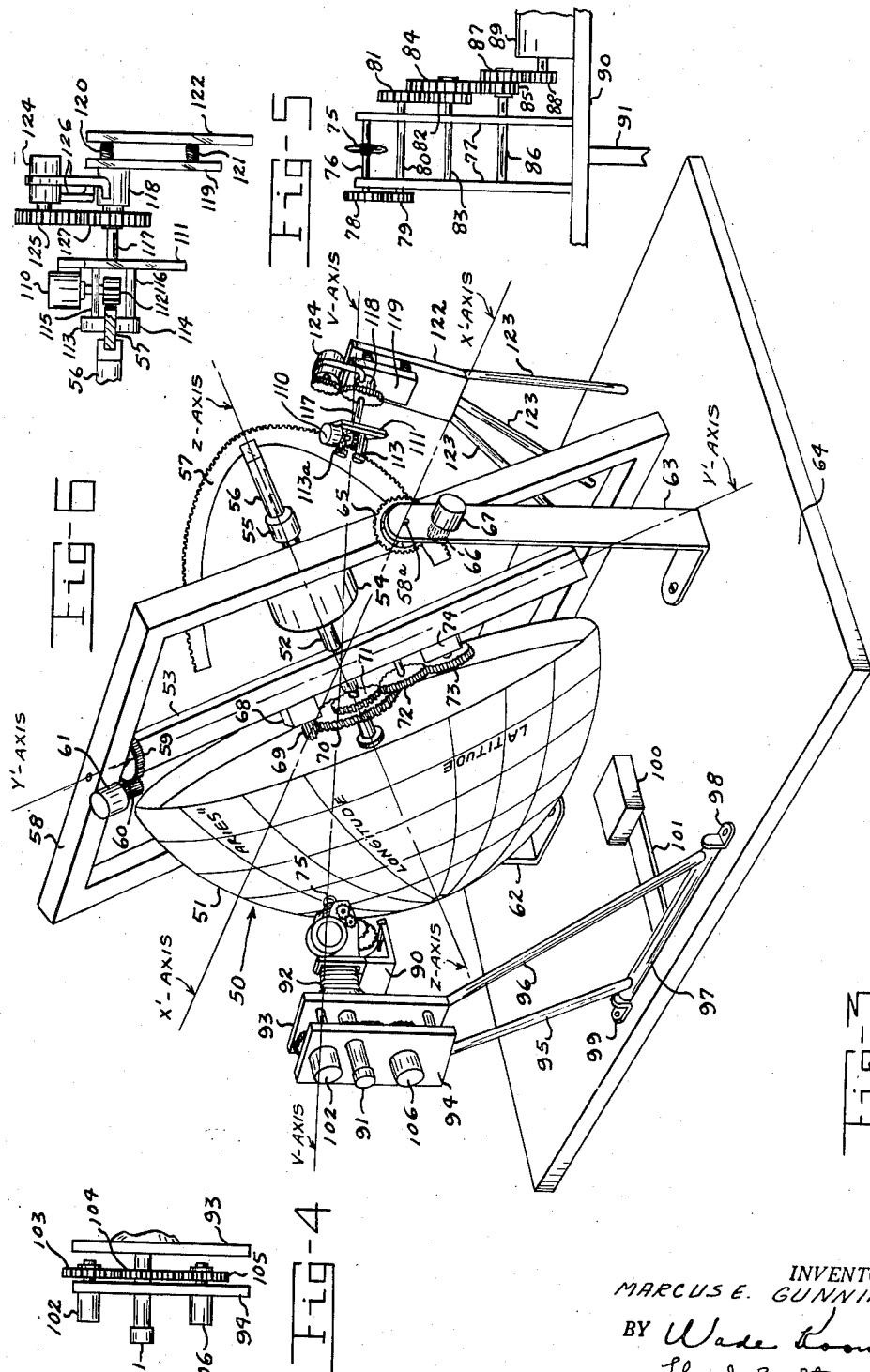
INVENTOR.
MARCUS E. GUNNING
BY Wade Koontz
Lloyd B. Stevens, Jr.
ATTORNEYS

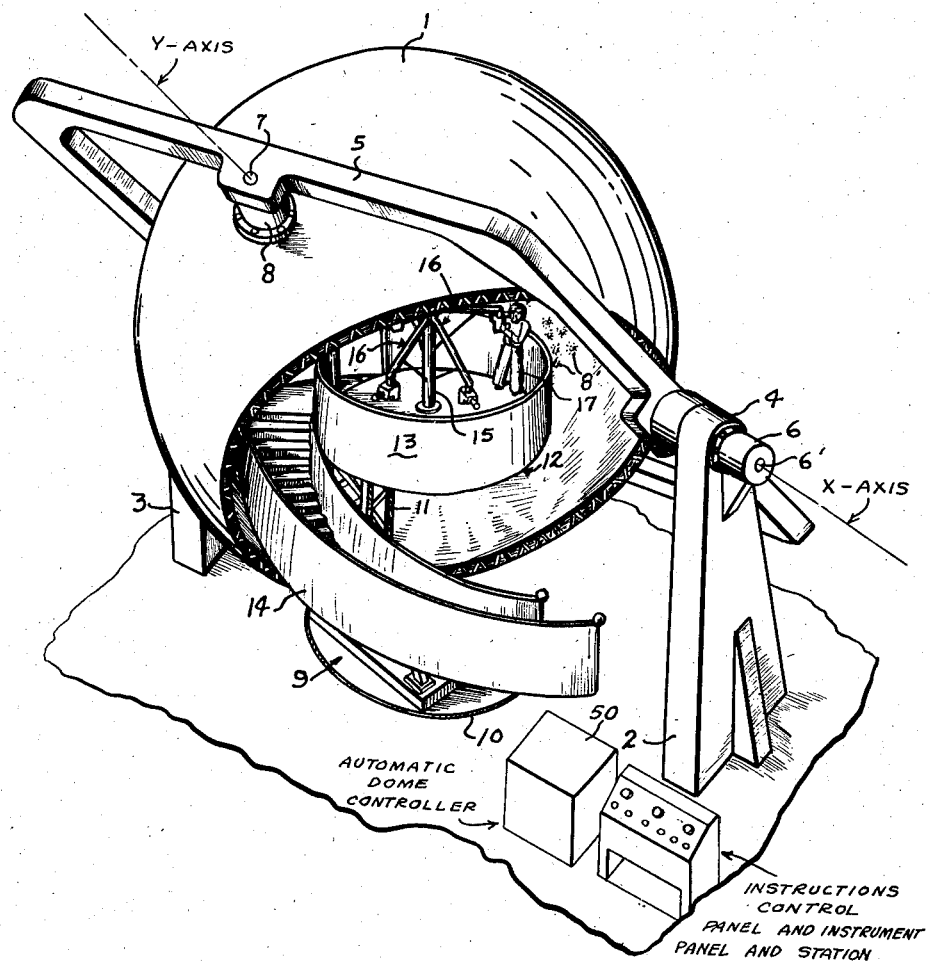

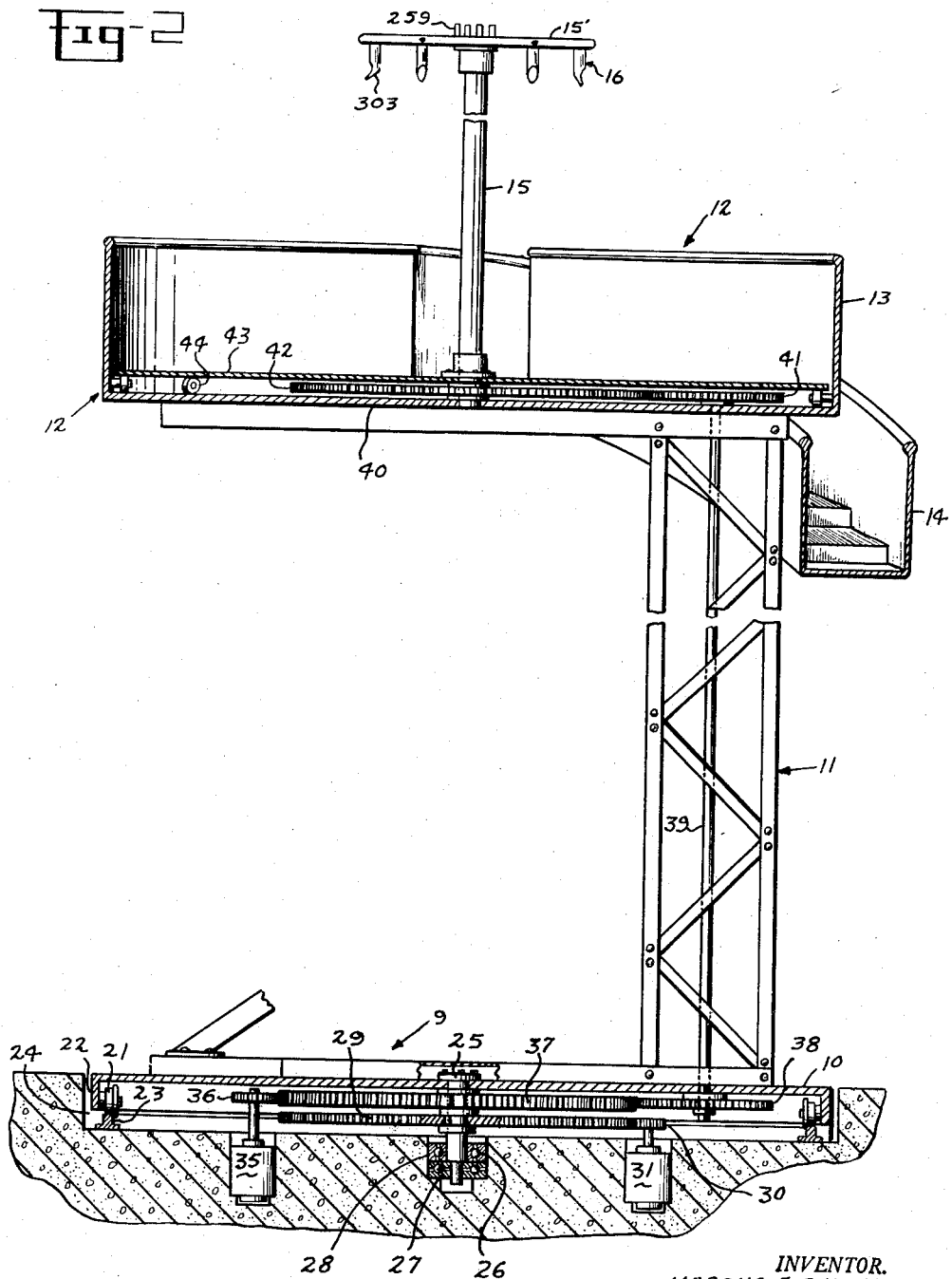

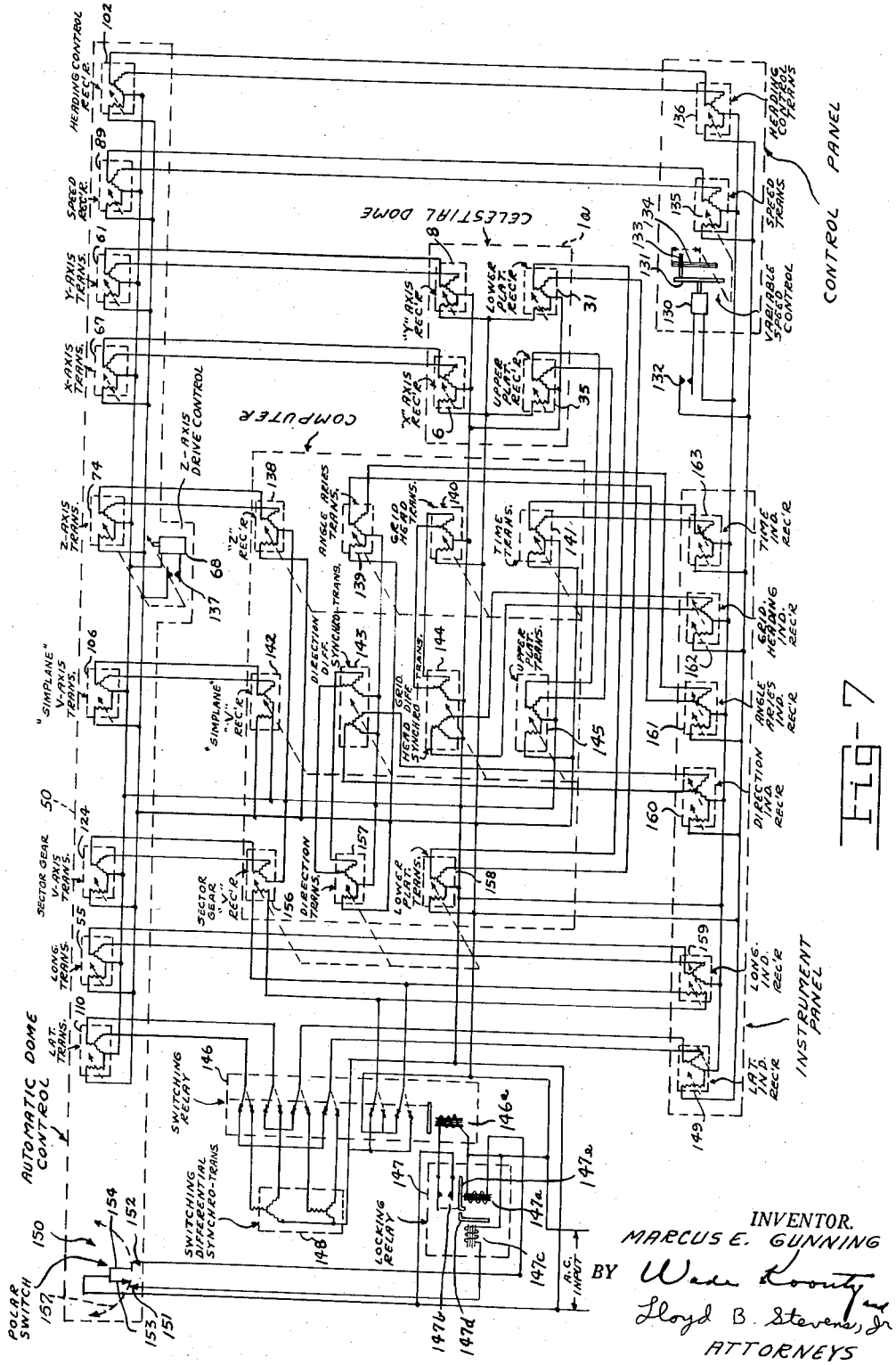

United States Patent Office 2,885,791
Patented May 12, 1959

2,885,791

CELESTIAL NAVIGATION TRAINER

Marcus E. Gunning, Medway, Ohio

Application December 12, 1955, Serial No. 552,671

4 Claims. (Cl. 35—10.2)

(Granted under Title 35, U.S. Code (1952), sec. 266)

The invention described herein may be manufactured and used by or for the United States Government for governmental purposes without payment to me of any royalty thereon.

The present invention relates to a celestial navigation training device for training and instructing aircraft navigation personnel, primarily in high speed, high altitude flying.

This invention comprises a celestial observation dome, an automatic dome controller, and an instructor's control station. The celestial observation dome is rotatably suspended on a gimbal which in turn is rotatably supported on a pair of standards to provide rotation of the dome about two axes, these axes being normal to each other. Under the celestial observation dome is a rotatable platform supporting a plurality of periscopic sextants through which students may observe star images representing celestial bodies on the concave side of the dome simulating the heavens to make navigational calculations. Obviously one sextant could have been used, but then only one observer could take readings at a time. The dome and the platform are driven by conventional type selsyn receivers or synchro receivers to which intelligence is transmitted from conventional selsyn generators or synchro transmitters on the automatic dome controller. A conventional type of combination of a synchro receiver to control a servo motor system can be used to drive the shaft wherever heavily loaded shafts must be driven since a synchro or selsyn receiver alone does not receive a strong enough signal from the synchro transmitter or selsyn generator to do heavy work. The automatic dome controller consists of a portion of a world globe of reduced scale which travels under a "simplane" wheel, which is under the control of the instructor at the instructor's station located conveniently, for instance near the celestial dome structure. The "simplane" is a sub-assembly including a tracking wheel, means to rotate the wheel at different speeds, and means to change the direction of the heading of the wheel. The word "simplane" is an abbreviation for simulated airplane. In addition to simulated airplane "simplane" could represent a missile or other vehicle moving over the earth's surface. The instructor's station has manual controls which are operative to put speed and direction in the "simplane" as the instructor sees fit in setting up a navigational problem. The position of the "simplane" wheel with respect to the earth represents the aircraft travel which is transmitted by the synchro transmitters on the automatic dome controller to celestial observation dome synchro receiver motors to position the last mentioned dome and the platform for observation from the platform through the sextants corresponding to observation from an actual aircraft above the earth at the point that the "simplane" wheel is located on the reduced scale earth globe. Thus, an instructor can present a navigational problem at the instructor's station which can be solved by observer students on the platform under the celestial dome. Other students can be accommodated at remote stations having instruments supplying information to solve the navigational problem.

It is therefore a general object of this invention to provide a celestial navigation trainer having a station at which an instructor can present a navigational problem by manual control of electrical devices controlling speed, direction, etc., of a "simplane" wheel on a miniature world globe portion, in which travel of the "simplane" wheel is transmitted to a celestial dome and platform motor synchro receivers, positioning the observers under the celestial dome for observing star images representing actual celestial bodies corresponding to an actual aircraft situation at the location represented by the "simplane" wheel on the miniature globe portion whereby the observers may solve the navigational problem.

It is a further object of the invention to provide periscopic sextants having horizontally disposed body members so a number of navigator trainees can simultaneously take sextant readings.

It is an additional object of the invention to provide a leveling device suitable for use on sextants wherein scanning in a horizontal plane is accomplished without swinging the entire sextant in azimuth.

It is still another object of the invention to provide an automatic controller designated as an automatic dome controller for use with the navigational trainer, which controller is capable of use with other equipment for solving mathematic problems such as integrations and differentiations in addition to its use in the navigational trainer.

The above and other objects, advantages, purposes and uses of the invention will become more apparent upon reading the following detailed description of the invention in conjunction with the accompanying drawings, in which:

Fig. 1 is a perspective view of the large celestial observation dome incorporating the invention and diagrammatically showing the associated locations of the instructor's panel and control station and the location of the automatic dome controller;

Fig. 2 is a vertical cross sectional view taken through the observation platform mounted under the celestial observation dome of Fig. 1;

Fig. 3 is a perspective view of the details of the automatic dome controller shown in Fig. 1;

Fig. 4 is an elevational view of a portion of the "simplane" supporting structure of Fig. 3 showing gearing;

Fig. 5 is an elevational view of another portion of the "simplane" supporting structure of Fig. 3 including the "simplane" wheel 75, gearing, etc.;

Fig. 6 is an elevational view of a portion of the synchro transmitter apparatus associated with the large sector gear to show more detail than is shown in Fig. 3; and Fig. 7 is a schematic electrical interconnection wiring diagram for the celestial navigation trainer.

In teaching celestial navigation it is desirable to provide means for simulating the heavens as it appears at night and to also make the simulating means move with respect to an observer or student in order to simulate the relative movement of the stars with relation to an observer who is traveling, for instance, in an airplane. The relative movement and change in position of the stars must also be simulated with the passing of time required to complete a certain selected course of an aircraft over the earth's surface. Furthermore, in order to provide a practical celestial navigation trainer it is desirable that means for simulating the positions of the stars in the heavens be under the control of an instructor and that the instructor have a map on which to chart the navigation problem at hand. With these requirements in view the present invention contemplates provision of a large celestial dome rotatably and tiltably mounted and provided on the inside surface thereof with numerous navigational star images visible to the student stationed inside the dome on a suitable platform. The invention further contemplates a combined course recording and dome position controlling apparatus conveniently accessible only to the instructor who is preferably located at a point somewhat remote from the celestial observation dome. The invention also contemplates various indicating means on an instructor's control panel located before the instructor so connected to the dome controller as to continuously indicate certain fundamental navigation data. Since it is desirable to accommodate several students at a time, the invention further provides for grouping the students about a central point on the observation platform and for permitting the several students to simultaneously view the same collimated star images on the inner surface of the celestial dome at the same altitude angle by use of a special periscopic sextant for each student. The various parts of the celestial navigation trainer will be described in detail.

*Observation dome and platform*

The celestial observation dome 1, as shown in Fig. 1, is mounted for limited rotation between a pair of spaced piers or towers 2 and 3 securely fixed to the floor or foundation of the surrounding building structure. The upper ends of the piers are provided with bearings 4 in which are rotatably mounted the aligned trunnions extending from opposite sides of a large gimbal ring or frame 5. In order to rotate the gimbal ring 5 about the axis, designated the X-axis, of the bearings 4, an electric synchro receiver motor 6 is mounted on pier 2 and the adjacent frame-connected trunnion is connected to be rotated by said synchro-receiver motor by means of suitable gearing between the trunnion and the motor shaft 6'. An electric synchro receiver motor is defined as a conventional combination of a conventional selsyn or synchro receiver controlling a conventional servo motor wherever used in this application. Extending toward each other from opposite sides of the gimbal ring 5 are axially aligned dome supporting trunnions 7 fixed to the gimbal ring 5 and providing an axis, designated as the Y-axis, of rotation for the celestial dome 1 which axis is at right angles to the aforesaid X axis through the frame-connected trunnions carried in the bearings 4. The intersections of these X- and Y-axes is at the spherical center of the celestial dome 1. On the celestial dome is mounted a second electric synchro receiver motor 8 which is connected to the adjacent trunnion 7 by means of suitable gearing between the trunnion and the motor shaft of the latter motor and the adjacent trunnion. Thus it may be seen that the celestial dome is mounted for universal movement about the X and Y axes thereof through a limited range and that the relative position may be varied by proper operation of the two drive motors 6 and 8. The celestial dome 1 may be of any reasonable size but in a certain installation it has been made to have an inside diameter of thirty feet. The dome wall structure may take many different forms but the preferred construction is of welded steel tubing built up in a network of rigid truss-like sections covered with an outer surface formed of sheet material such as wire screening. On the outside the screening may be covered to present a smooth surface. The inside of the dome may or may not be covered but in any case the exposed surfaces should be a dead black in color. Securely fixed on the inside surface of the spherical celestial dome 1 are a plurality of light sources 8' for the simulation of star images. In a celestial navigation trainer of the kind under consideration and in which the dome is a little greater than a hemisphere, the total number of star images may be approximately five-hundred. However, a number of the more important star images should be formed by means of collimated projectors to provide parallel rays of light throughout a beam about five to eight inches in diameter. Out of five-hundred star images there may be, for example, twenty-three produced by collimated light sources and, assuming the trainer is built for use in the northern hemisphere, these twenty-three star images may represent the following stars:

1. Polaris
2. Alkaid
3. Deneb
4. Alpheratz
5. Alphecca
6. Aldebaran
7. Altair
8. Procyon
9. Dubhe
10. Capella
11. Vega
12. Pollux
13. Arcturus
14. Regulus
15. Betelgeuse
16. Rigel
17. Spica
18. Deneb Kaitos
19. Nunki
20. Alphard
21. Sirius
22. Antares
23. Formalhaut Furthermore, all the collimators should be mounted in the celestial dome in such manner that the center of their light beams pass through the geometrical center of the dome for all rotative positions thereof, and the collimated beams from each collimator encompass the objective piece prisms of all the sextants.

Midway between the piers 2 and 3 is an observation platform comprising as seen in Fig. 2, a turntable or a pedestal 9 including a rotatable base 10, column 11, and gallery 12. The gallery 12 is provided with a side wall or railing 13 and is reached by mounting a curved staircase 14 attached thereto as shown. Extending upwardly from the center of the gallery 12 is a post 15 having radiating therefrom a plurality of evenly spaced periscopic sextants 16 supported by a sextant supporting ring 15'. As shown in Fig. 1 only one sextant is in use by an observer or student 17. It is noted that the gallery supporting column 11 is fixed to the base 10 and gallery 12 at one edge portion so that the celestial dome 1 may be swung until the wall thereof at one edge is under the gallery. Thus even though the dome is greater than a hemisphere, it may be tilted an extent corresponding to that which would be impossible with a hemispherical dome without this feature, provided of course that the observation platform or pedestal 9 is first rotated about its central vertical axis to bring the column 11 to a position remote from the lowermost rim of the celestial dome 1.

Referring now more particularly to Fig. 2 showing the pedestal or platform 9 more in detail, the column 11 is of braced beam construction and anchored to the base 10 in any suitable manner. Likewise, the gallery 12 is fixed in any suitable manner to the upper end of the column 11, both the base 10 and the gallery 12 being circular and concentric and the points of attachment of the column 11 to the base and gallery being eccentric to the center of the base 10 and the gallery 12. The base 10 is supported on the floor in a manner to rotate as a turntable by rollers 21 journaled to the inner surface of a downwardly extending peripheral extension 22 which rollers 21 operate on a circular track 23 supported in the floor. The floor has a circular well 24 in which the base 10 is rotatably supported to make the top of the base 10 level with the normal floor. The base 10 has a downwardly extending axle 25 in the center thereof that extends through and is laterally supported in a roller bearing 26 and rests in a thrust roller bearing 27, both roller bearings being supported in a well 28 centrally of the circular well 24. Keyed to the axle 25 is a spur-wheel 29 that is in mesh with a pinion gear 30 keyed to the shaft of an electric synchro receiver motor 31 supported in any suitable manner in a cavity in the floor of the well 24. It may now be understood that upon the operation of the electric synchro receiver motor 31 the base 10 will be rotated about its center carrying the gallery 12 therewith.

An electric synchro receiver motor 35 having a pinion gear 36 thereon is also supported in a cavity in the floor of the well 24 of the supporting structure in any suitable manner such that the pinion 36 is in mesh with a spur-wheel 37 journaled for free rotation on the axle 25. The spur-wheel 37 is in mesh with a gear wheel 38 keyed to a shaft 39 which shaft is journaled in the base 10 and the floor 40 of the gallery 12. A gear wheel 41 is keyed to the upper end of the shaft 39 and meshes with a spur-wheel 42. The spur-wheel 42 is fixed to post 15 which is journaled at its lower end in the floor 40 of the gallery 12 and which post 15 is also rigidly fixed to and supports the center portion of a rotatable platform 43 in the gallery, the peripheral edge of such rotatable platform 43 being supported on rollers 44 fixed to the wall 13 of the gallery 12. Thereby, base 10 and gallery 12 are rotatable independently of the rotation of the platform 43 and post 15, and visa-versa. As described in connection with Fig. 1, the post 15 supports a plurality of periscopic sextants 16. The stairway 14, shown in both Figs. 1 and 2, as may be clearly seen, is fixed to the gallery 12 at the top and to the base 10 at the bottom with the central portion thereof adjacent the column 11 leaving the space between the base 10 and gallery 12 substantially clear to allow the lower zonal area of the celestial dome 1 to operate freely in this space.

*Automatic dome controller*

Referring now particularly to Figures 3, 4, 5 and 6, views are shown of the automatic dome controller designated generally by the reference character 50. This automatic dome controller which is broadly designated as the automatic controller is specifically designed to control the position of the celestial dome 1 of the celestial navigation trainer, but it is capable of use as a controller with or without other equipment for solving mathematic problems such as integrations and differentiations and in addition for other control uses. The globe 41, which is a portion of a sphere, can be of any suitable material on which a portion of a world globe can be fastener as by cementing, i.e., in this case with the true north pole of the map being placed on the axis Z of rotation of the surface. The globe 51 is supported by a shaft 52 which is fixed to the globe 51, and shaft 52 is journaled in and supported by cross member 53. Shaft 52 represents the North-South polar axis of the earth and in this case is designated as the Z-axis. A counterbalancing weight 54 is fixed on shaft 52 on the side of cross member 53 opposite to that on which the globe portion 51 is located for the purpose of counterbalancing the weight of the globe portion 51. Shaft 52 extends beyond the counterweight and is fixed to the stator casing of "longitude" synchro transmitter 55. Shaft 56 is rigidly attached to the rotor of synchro transmitter 55, and the shaft 56 at its opposite or outer end is rigidly attached to a sector gear 57.

Cross member 53 is journaled for relative adjustment on pins at both ends in a gimbal ring 58 and is square in shape in this case, to provide for rotation of the cross member 53 on an axis designated as the Y'-axis. Gear 59 is fixed to cross member 53 at one end and rotates with it. Synchro transmitter 61 is fixed by its casing to gimbal ring 58; and gear 60 attached to the rotor of synchro transmitter 61 meshes with the gear 59, so the rotated adjustment of member 53 about the said Y'-axis is indicated and transmitted by synchro transmitter 61.

Gimbal ring 58 is supported by and journaled by pins or rods 58a in brackets 62 and 63, which are supported from base 64. The supporting axis, designated as the X'-axis, of the gimbal ring 58 is perpendicular to the supporting axis or, Y'-axis, of cross member 53 and globe portion 51. The globe portion 51 is therefore movable about two perpendicular axes, and the intersection of these axes is at the spherical center of the globe portion 51. Also the Z-axis passes through the spherical center of the globe portion 51. Also the globe portion 51 is rotatable with shaft 52 about the Z-axis to give it an additional motion which is used as a sidereal time motion to be later described. Gear 65 is rigidly attached to the pin 58a on the X'-axis whereby gimbal ring 58 is journaled in and supported by brackets 62 and 63. Synchro transmitter 67 which is supported by its stator casing from bracket 63 has gear 66 rigidly attached to its rotor shaft, and this gear 66 meshes with gear 65 secured to the gimbal ring 58 with the result that the rotated position of the gimbal ring 58 on its X'-axis is indicated and transmitted by synchro transmitter 67.

Provision is made for rotating the globe portion 51, and thus the map surface, on its north south Z axis, i.e., shaft 52, at the rate of 1 complete rotation about this axis per 23 hours and 56+ minutes. This is to correspond to the rotation of the earth in a sidereal day. A conventional constant speed motor 68 is the motive force for this sidereal time motion. Gear 69 keyed to the drive shaft of motor 68 meshes with gear 70 which is keyed to shaft 52 to cause one complete rotation of this shaft in a sidereal day. Gear 71 keyed to shaft 52 meshes with and drives idler gear 72 which meshes with and drives gear 73 keyed to the rotor shaft of the synchro transmitter 74, and this synchro transmitter transmits the angle "Aries" position of the globe 51 as well as sidereal time information and information used in determining grid heading.

The globe 51 and surface map attached thereto are caused to move by frictional forces as a result of the rotation of "simplane" wheel 75 in contact with the outer surface of the globe 51. It is also preferred to have an inking pen or wheel associated with the "simplane" wheel so a track is made on the map representing the course of the simulated airplane over the surface of the earth. Actually the "simplane" wheel itself can be inked. If erasable ink is used, the map on the globe need not be replaceable. Otherwise it must be replaceable. This movement of the globe 51 is by rotative adjustment of cross member 53 on its Y' axis and/or by rotative adjustment of gimbal ring 58 on its axis. The speed of this movement and direction is determined by the speed and heading of "simplane" wheel 75. Of course there is the additional sidereal rotational component of globe 51 caused by motor 68.

Fig. 5 shows a detail of "simplane" wheel 75 related gears, etc. "Simplane" wheel 75 is keyed to shaft 76 which is journaled in frame 77. On one end of shaft 76 is keyed gear 78, which meshes with gear 79 keyed to shaft 80 which is journaled in frame 77. On the opposite end of shaft 80 is keyed gear 81 which meshes with gear 82 which is keyed to shaft 83 which is journaled in frame 77. Gear 84 is also keyed to shaft 83 and meshes with gear 85 which is keyed to shaft 86 which is also journaled in frame 77. Gear 87 is also keyed to shaft 86 and meshes with gear 88 which is keyed to the rotor shaft of synchro receiver 89. Thus synchro receiver 89 drives "simplane" wheel 75 in rotation through the chain of gears just described. This synchro receiver 89 is supported by plate 90 which is rigidly attached to shaft 91. In Fig. 3 slip rings 92 are shown (without detail) positioned on shaft 91 for feeding power to synchro receiver 89. Shaft 91 as shown in Figures 3 and 4 is journaled in and supported by plates 93 and 94. Plate 94 is supported by plate 93 which in turn is supported by arms 95 and 96 which are rigidly attached to shaft 97 which is journaled in brackets 98 and 99 supported by base 64. Counterweight 100 rigidly attached to arm 101 which is rigidly attached to shaft 97 is used for the purpose of keeping "simplane" wheel 75 against the map surface of the globe 51 for rotation of the globe. The point of contact of "simplane" wheel 75 on globe is on the V-axis which passes through the spherical center of the globe 51 and "simplane" wheel 75 is supported on the V-axis by the shaft 91.

Fig. 4 shows a detail of the gearing associated with plate 94. Shaft 91 is driven by synchro receiver 102 through gear 104 keyed to shaft 91 and gear 104 meshes with gear 103 which is keyed to the rotor shaft of synchro receiver 102. Synchro receiver 102 is supported by plate 94. Gear 104 meshes with and drives gear 105 which is keyed to the rotor shaft of "simplane" synchro transmitter 106 which is supported by plate 94. Thereby, synchro transmitter 106, called the "simplane" V-axis transmitter, indicates and synchro receiver 102 fixes the heading of "simplane" wheel 75 about the V-axis.

Referring now particularly to Fig. 6 as well as Fig. 3, additional indicating mechanism is shown which is associated with sector gear 57. Synchro transmitter 110 which is supported by plate 111 is driven by gear 57 through sector gear 112 which is keyed to the rotor shaft of synchro transmitter 110. Rollers 113 and 113a (see Fig. 3) and companion rollers 114 on the opposite face of the sector gear, which rollers are journaled on rods 115, and 116 tend to hold gear 112 in mesh with sector gear 57. The V-axis also passes through the midpoint of meshing contact between gear 112 and sector gear 57. The rods on which the rollers just mentioned are journaled are rigidly attached to plate 111. Plate 111 is rigidly attached to shaft 117 which rotates on the V-axis and which is journaled in bearing 118 supported by plate 119. Power is fed to synchro transmitter 110 through conventional slip rings (not shown) extending around shaft 117. Plate 119 can be supported for spring adjustment by spring means 120 and 121 from plate 122, or this spring support arrangement can be eliminated and plate 119 becomes the basic support plate for holding gear 112 in proper mesh, which plate 119 would then be supported directly by legs 123, as plate 122 is shown supported in Figure 6. It was found that this spring support arrangement was not necessary after proper adjustment and meshing relation of the parts is made. Sector gear synchro transmitter 124 is supported by supports 126 from the housing of bearing 118. Shaft 117 is driven by gear 127 which is keyed to shaft 117 and meshes with gear 125 which is keyed to the rotor shaft of synchro transmitter 124.

Rather than the conventional synchro receivers or Selsyns indicated in the discussion above, a conventional combination of a synchro or Selsyn receiver controlling a servo motor can be used to provide the necesary power wherever the load on the shaft being driven necessitates it.

*Interconnection of units*

The electrical circuits for operating and interconnecting the various units of the apparatus are shown in Fig. 7. There is an additional unit of the apparatus which has not been discussed to any extent and this is the instructor's control station. At the instructor's control station schematically disclosed in Figures 1 and 7 is located the instrument panel, the control panel, the computer, the switching relay 146, the locking relay 147, and the switching differential synchro 148, see Figure 7. The polar switch 150 in Figure 7 is located on the automatic dome control 50 in addition to a number of other units which will be discussed all schematically disclosed in Figure 7.

A small block 1a set off by dashes and marked by legend in Figure 7 shows the controls 6, 8, 31 and 35 located on the celestial dome structure itself.

Reference is now made to the control panel as schematically illustrated in Figure 7 which operates the automatic dome control. Motor 130 which can be a synchronous constant speed motor which drives circular disk 131 through an interconnecting shaft, and this motor can be started by closing switch 132 which connects A.C. power to the motor 130. A drive wheel 133 which is splined on and slidable on shaft 134 is rotated through friction contact by disk 131. Wheel 133 is slidable on the shaft 134 between the center of the disk 131 and the periphery thereof thus giving a rather wide range speed of rotation for the wheel 133 and shaft 134 from 0 at the center of the disk 131 to a maximum speed at the periphery. Wheel 133 through shaft 134 mechanically drives synchro transmitter 135 which electrically drives synchro receiver 89 (Fig. 5) which in turn drive the "simplane" wheel 75. Thus "simplane" wheel 75 is driven simulating the speed of an airplane on which observations are taken.

On the control panel in Figure 7 a second synchro transmitter 136 is located. The rotor of this synchro transmitter or selsyn is manually adjusted to simulate the heading of the airplane. This heading is adjusted to hold a constant desired simulated direction of the airplane as indicated by direction indicator 160 on the instrument panel in Figure 7. Synchro transmitter 136 electrically drives synchro receiver 102 (Fig. 4) which position shaft 91 and thus the heading of "simplane" wheel 75. A signal from the direction indicator 160 in Figure 7 can be used to automatically hold a set direction of the simulated heading of the airplane represented by the track of the "simplane" wheel 75 on the surface of the globe portion 51.

Rotation of the earth upon its axis is simulated by closing switch 137 of the Z-axis drive control in Figure 7 to feed power to motor 68, which causes dome 51 to rotate upon Z-axis according to sidereal time (See Fig. 3).

At the start of a problem using the navigational trainer the instructor would set a certain angle "Aries" as shown by the angle "Aries" indicator 161 on the instrument panel into the automatic dome controller 50 by manually rotating dome 51 on its Z axis, rotating shaft 52, until the proper angle is set. The "simplane" wheel 75 should be lifted from contact with the globe in this operation and the motor 68 should be shut off. At the same time while maintaining the set position of the angle "Aries," the map surface on globe portion 51 is positioned under "simplane" wheel 75 at a certain desired longitude and latitude with respect to the point of "Aries" from which the problem is to begin. Then at the set time for the problem to begin the instructor turns on motor 68 and sets in the speed and direction for the "simplane" wheel 75 from the control panel in Figure 7 described above. The problem is now underway and unless the airplane speed or heading are changed, no other control settings are made other than to maintain the ones already set. In other words all the other instruments, synchro transmitters and receivers and servo motors automatically indicate or position other components of the apparatus as will be described below in greater detail from Fig. 7 and related drawings.

Z-axis synchro transmitter 74 provides the signal which indicates the rotated position of shaft 52 at any instant since it is mechanically connected to the shaft through gearing 71, 72 and 73, and the signal from synchro transmitter 74 electrically drives synchro receiver 138 in the computer shown in Figure 7. Synchro receiver 138 is mechanically coupled to and drives the angle "Aries," grid heading, and time synchro transmitters 139, 140 and 141.

V-axis synchro transmitter 106 in the automatic dome control is mechanically driven through gears by shaft 91 in Figures 3 and 4 and indicates the heading of the airplane as simulated by track of the "simplane" wheel 75, and "simplane" synchro transmitter 106 electrically drives the V-axis "simplane" synchro receiver 142, which is mechanically coupled to and drives synchro transmitters 143, 144 and 145.

Latitude is directly indicated by latitude synchro transmitter 110 through the switching relay 146, locking relay 147 and the switching differential synchro transmitter 148 by electrical transmission to the latitude indicator 149 on the instrument panel in Figure 7. Switching the switching differential synchro 148 in or out of the circuit as described below provides for the latitude indicator 149 to indicate an increasing reading until 90° is reached in passing through a polar situation at the Z-axis and a decreasing reading thereafter as it should. The interconnection of these elements is coordinated by polar switch 150. Electrical contacts 151 and 152 of the polar switch shown in Figure 7 are supported by frame 111 (Fig. 5), but this figure does not show them. Electrical contacts 152 and 154 of the polar switch 150 shown in Figure 7 are supported by sector gear 57 in Figure 6 and are located at the point of attachment of gear 57 to shaft 56. It will be noted in Figure 7 that contacts 151 and 152, center to center, are spaced farther apart than the spacing center to center of contacts 153 and 154. The contacts 151 and 152 are of such width that as contacts 153 and 154 on sector gear 57 approach the relatively stationary contacts 151 and 152 and pass on by in the same direction say from left to right in Fig. 7, the sequence of operations will be as follows: (a) Contact 154 contacts 151 energizing solenoid 147c. However, arm 147d of locking relay 147 is held towards solenoid 147c by the tab on arm 147e. (b) As motion of contacts 153 and 154 is continued contact 153 contacts contact 151, and a similar condition exists as when contact 154 contacted contact 151. (c) When contacts 153 and 151 and contacts 154 and 152, respectively, are simultaneously in contact, arm 147d is pulled against solenoid 147c, and arm 147e is pulled against solenoid 147a, closing contacts 147b and energizing solenoid 146a to bring the contacts of switching relay 146 to their dotted positions as shown in Figure 7. (d) When contact 153 in passing breaks contact with contact 151 but contact 154 is still in contact with contact 152, arm 147d is released by solenoid 147c becoming deenergized and latches over arm 147e, holding contacts 147b closed. (e) On further motion when contact 154 breaks contact with contact 152, arm 147e is held toward solenoid 147a by the tab on arm 147d and contacts 147b remains closed. (f) When contact 153 contacts contact 152 this energizes solenoid 147a but no change in position of arm 147e occurs since it is held toward solenoid 147a by the tab on arm 147d. If the travel of the polar switch 150 were now from right to left under the conditions above established in going from left to right, the switching is in reversed sequence and contact 147b will be closed at the instant that contact 154 disengages contact 152 since contact 153 still engages contact 151, and the arms of switching relay 146 will assume their solid positions under spring action as shown in Figure 7. This locking relay system 147 is to insure that switchover occurs only as the polar position or Z-axis is actually crossed but does not occur if the pole or Z-axis is approached by the "simplane" wheel but veered away therefrom. Thus switching differential synchro 148 will or will not be in the circuit between latitude synchro transmitter 110 and latitude indicating receiver 149, depending on the sequence of operations described above. If initial conditions are not correct on start up of the navigational trainer, the situation can easily be corrected by manual or push button (not shown) operation of the switches. From then on during continuous operation, the operation of this system will automatically be correct without further manual manipulations.

V-axis sector gear synchro transmitter 124, which is physically located in Figs. 3 and 6, electrically drives synchro receiver 156 which is designated the V-axis sector gear receiver. This V-axis receiver 156 mechanically drives synchro transmitter 157, the direction transmitter, and also drives the synchro transmitter 158 which is designated the lower platform transmitter. The V-axis is designated as the axis on which shafts 91 and 117 in Figures 5 and 6 rotate. This axis passes through the spherical center of globe portion 51.

Synchro transmitter 55 which is designated as the longitude transmitter is electrically coupled to and drives synchro receiver 159 which is physically located on the instrument panel as seen in Figure 7 and is designated as the longitude indicator. It is noted that A.C. power for synchros 156 and 159 is fed to their rotors through switching relays 146 thereby it is provided that the A.C. connections to these rotors can be switched through the operation of the switching relays 146 to give a 180° phase reversal causing the longitude indicator to indicate a position 180° displaced from the position prior to the operation of the relay.

The direction indicator designated as synchro receiver 160 and located on the instrument panel is electrically connected to and driven by synchro transmitter 143 which is designated as the direction differential synchro. This direction differential synchro transmitter 143 is driven indirectly by synchro transmitters 106 and 124. The combination of these signals gives an indication on the direction indicator 160 of the true direction heading of the airplane.

Angle "Aries" indicator in Figure 7 is designated as synchro receiver 161 and this indicator is electrically driven by synchro transmitter 139 which is designated as the angle "Aries" transmitter. As stated previously the angle "Aries" transmitter 139 is mechanically driven by synchro receiver 138 which is electrically driven by synchro transmitter 74 shown in Figure 3, which is designated as the Z-axis transmitter in Figure 7.

The grid heading indicator 162 is designated as synchro receiver 162, and this indicator is electrically driven by synchro transmitter 144 which is called the grid heading differential synchro. Synchro transmitter 144 receives its driving impulses indirectly from Z-axis and V-axis synchro transmitters 74 and 106.

The sidereal time indicator like the other indicating devices is located on the instrument panel and is designated as synchro receiver 163. This time indicator is driven electrically by synchro transmitter 141 which is designated as the time transmitter. Synchro transmitter 141 is indirectly driven by the Z-axis synchro transmitter 74.

In Fig. 7, stator movement as well as rotor adjustment is schematically shown for the selsyns or synchro receivers for the indicators, e.g., the latitude, longitude, direction, etc., indicators. This arrangement allows for manual setting, e.g., in the stator of the time indicator 163, the stator would be rotated to set in the time of the start of the problem. This is a conventional arrangement for instruments of this type.

Reference is now made to Figs. 1 and 2 as well as to Figs. 3 and 7. Synchro transmitter 67 on the automatic dome control which is designated as the X'-axis transmitter electrically transmits its signal and drives synchro receiver 6 on the X-axis of the celestial dome. Normally the synchro or selsyn receiver 6 would designate a conventional selsyn combination synchro receiver controlling a servo motor since the load to drive shaft 6' would be heavy. Synchro or selsyn generator 61 located on the automatic dome control in Figures 3 and 7 which is designated as the Y'-axis transmitter electrically drives synchro receiver 8 which is the Y-axis receiver located on the celestial dome 1. Also, because of the load involved normally the synchro receiver 8 will be a combination of a synchro or selsyn receiver controlling a servo motor to drive shaft or pin 7 for rotating the dome 1. Thereby, the celestial dome is positioned on its X- and Y-axis in accordance with the position of the automatic dome control on its X'- and Y'-axes.

The details of the positioning of the upper and lower platforms of the celestial dome are shown in Fig. 2. Synchro receiver 31, preferably a synchro or selsyn receiver controlling a servo motor, which drives the lower platform 10 of the celestial dome 1 is electrically driven by the lower platform selsyn generator or transmitter designated synchro 158 in Figure 7, and synchro transmitter 158 is indirectly driven by synchro transmitter 124 which is designated in Figures 3 and 7 as the V-axis transmitter. The lower platform is driven in accordance with the movements of the celestial dome 1 to keep stairway 14 and offset column 11 out of the way of the celestial dome as it is tilted on its X-axis and rotated on its Y-axis. Also in Fig. 2 is shown synchro or selsyn receiver 35, preferably a synchro or selsyn receiver controlling a servo motor, which is designated as the upper platform synchro receiver in Figure 7. The upper platform receiver 35 is electrically driven by the upper platform synchro transmitter 145 which is electrically driven by synchro transmitter 106, designated as the V-axis transmitter. In other words, the upper platform 43 is positioned according to the direction of the heading of "simplane" 75.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. For example, different gear combinations can be used than shown to get better power amplification, speed of response, etc., and other mechanically equivalent elements or combinations can be substituted to do certain of the multitudinous operations accomplished by the apparatus. Accordingly, modifications are contemplated which may be made without departing from the spirit of the described invention or of the scope of the appended claims.

What is claimed is:

1. A celestial navigation trainer comprising a pair of piers, a gimbal ring rotatively supported about a horizontal axis by said piers and said axis of rotation for said ring being designated as the X-axis, means to rotate said gimbal ring on its X-axis, a celestial observation dome rotatively suspended about an axis within said gimbal ring and said last named axis designated as the Y-axis which is normal to said X-axis, means to rotate said dome on its Y-axis, the intersection of said X- and Y-axes at the spherical center of said dome, collimated light sources representing star images positioned on the concave side of said dome so the center of their light beams pass through the geometrical center of the dome for all rotative positions thereof, a rotatable platform positioned under said dome and capable of supporting an observer, means to drive said platform in rotation; an automatic dome controller comprising a pair of brackets, a second gimbal ring rotatably supported by said brackets about a second horizontal axis of rotation and designated as its X'-axis, a cross member rotatively supported by said second gimbal ring with the supporting axis of the cross member being normal to the axis of said second gimbal ring to provide an axis of rotation for said cross member designated as the Y'-axis, a shaft rotatably supported at an intermediate point on said cross member, a portion of the world globe having a globe map thereon of reduced scale rigidly attached to one end of said shaft in such a fashion that said shaft is the north-south axis of said globe portion and is designated as the Z-axis, the intersection of the dome controller X'-, Y'- and Z-axes being at the spherical center of said portion of said world globe, means to rotate said shaft to simulate the rotation of the earth on its axis, means to indicate the rotated position of said shaft, means to counterbalance said globe, a "simplane" wheel positioned to contact the surface of said portion of said world globe, means to rotate said "simplane" wheel at any predetermined speed within a desired range to move the globe surface of the globe portion by friction drive between the "simplane" wheel and the globe surface simulating an airplane moving over the surface of the earth, means connected to the "simplane" wheel to change the heading of the "simplane" wheel to simulate the heading of an airplane moving over the earth's surface, said "simplane" wheel being rotated on an axis designated as the V-axis for changing heading which V-axis passes through the spherical center of the globe portion and in addition passes through the point of contact of the "simplane" wheel with the surface of the globe portion, means between the said brackets and said second gimbal ring associated with the X'-axis of said automatic dome controller connected for controlling the X-axis rotating means of the celestial dome to position the celestial dome on about said X-axis in accordance with the positioning of the said second gimbal ring X'-axis of the automatic dome controller, means between said second gimbal ring and said cross member associated with the Y'-axis of the automatic dome controller connected for controlling the Y-axis rotating means of the celestial dome to adjust the celestial dome about its Y-axis in predetermined relation to the adjustment of said dome portion of the automatic dome controller about said Y'-axis, means for adjusting the platform drive means of the celestial dome for rotative adjustment of said platform in accordance with the heading of the "simplane" wheel; an instructor's control and instrument panel comprising means connected to indicate the longitude position of the "simplane" wheel on the globe map, means to indicate the latitude position of the "simplane" wheel on the globe map, means to indicate the direction of the "simplane" wheel heading in relation to the position of the globe of the automatic dome controller, means connected to indicate the angle "Aries" position on the dome, means connected to indicate the grid heading of the "simplane" wheel with relation to the rotation of the globe portion on its north-south Z-axis, time indicating means connected to be controlled by the rotation of the globe on its north-south Z-axis, means connected to control the "simplane" wheel drive, means connected to set the speed of rotation of the "simplane" wheel, and means connected to control the setting of the heading of the "simplane" wheel.

2. A celestial navigation trainer comprising a pair of piers, a gimbal ring rotatively supported about a horizontal axis by said piers and said axis of rotation for said ring being designated as its X-axis, means to adjust said gimbal ring about said X-axis, a celestial observation dome rotatively suspended about an axis within said gimbal ring and said last named axis designated as a Y-axis which is normal to said X-axis, means to rotate said dome about its Y-axis, collimated light sources representing star images for navigational purposes positioned on the concave side of said dome so the center of their light beams pass through the geometrical center of the dome for all rotative positions thereof, a rotatable circular lower platform positioned under said dome, a column supported on said lower platform off-center near the periphery of said lower platform, a circular floor rigidly supported from said column concentrically above said lower platform, a gallery extending around said floor, an upper platform disposed concentric with and rotatably supported by said floor, a curved stairway communicating with said upper platform and curved around said column and supported by said lower platform and said floor, means supporting a plurality of periscopic sextants from the rotatable upper platform, said upper platform being capable of supporting observers for using said sextants, means to rotate said lower platform to position the stairway and column out of the path of interference with the dome during the rotation of the celestial dome, means to rotate said upper platform independently of the rotative adjustment of said lower platform; an automatic dome controller for controlling the position of said dome comprising a pair of supporting brackets, a second gimbal ring rotatably supported by said brackets to provide an axis of rotation for said second gimbal ring designated as its X'-axis, a cross member rotatively supported by said second gimbal ring to provide a supporting axis for the cross member normal to said X' axis of said second gimbal ring and designated as its Y'-axis, a shaft journalled for rotation at an intermediate position in said cross member, a portion of the world globe on reduced scale rigidly attached to one end of said shaft in such a fashion that said shaft is the north-south axis of said globe and designated as the Z-axis, the intersection of said X'-, Y'- and Z-axes being disposed at the spherical center of said globe portion, means to rotate said shaft about said Z-axis to stimulate one complete revolution of said globe portion in a sidereal day, transmitting means to indicate the rotated position of said shaft, a counterweight supported by said shaft to balance the weight of said globe portion, a synchro transmitter having a rotor and casing, said casing attached to the end of said shaft opposite the end attached to said globe portion, a sector gear attached to one end of said rotor, the other end of said rotor being concentric with the other end of said shaft, a rotatably mounted first synchro transmitter means geared to said sector gear to indicate "latitude" positions on said globe, a second synchro transmitter means geared to the sector gear to indicate the rotated position of the sector gear with respect to a V-axis, the axis of rotation of second synchro transmitter being on said V-axis which passes through the spherical center of the globe, a "simplane" wheel positioned to contact the outer surface of said globe portion, means to rotate said "simplane" wheel to cause rotation of said globe portion under said "simplane" wheel, means to change the heading of said "simplane" wheel on an axis designated as the V-axis which axis passes through the spherical center of the globe and the point of contact of said "simplane" wheel with the surface of said globe portion, synchro transmitter means connected to said "simplane" wheel to indicate the heading of said "simplane" wheel and control the rotative position of the upper platform of the celestial dome in accordance with the heading of the "simplane" wheel, about said V-axis, a synchro transmitter responsive to movement of said globe portion about the X'-axis of said globe for correspondingly controlling the position of the celestial dome about its X-axis in accordance with the position of said globe portion about its X'-axis, synchro transmitter means responsive to movement of said globe portion about the Y'-axis of said globe portion to correspondingly control the position of the celestial dome about its Y-axis in accordance with the position of said globe portion about its Y'-axis; an instructor's control and instrument panel comprising synchro receiver actuated means to indicate the longitude position of the "simplane" wheel on the globe portion with reference to first point of "Aries," synchro receiver means to indicate the latitude position of the "simplane" wheel on the globe portion with respect to Z-axis of the globe portion, synchro means connected to indicate the direction of the "simplane" wheel heading in relation to the position of the globe portion of the automatic dome controller, synchro receiver means responsive to the position of the globe portion about the Z-axis to indicate the angle "Aries," synchro transmitter means connected to the "simplane" wheel to indicate the grid heading of the "simplane" wheel with relation to the rotation of the globe portion on its north-south axis which is its Z-axis, synchro time transmitter indicating means connected to said globe portion for actuation by the rotation of the globe on its north-south axis for indicating sidereal time, synchro transmitted control means connected to control the "simplane" wheel drive means to set the speed of rotation of the "simplane" wheel in contact with the globe portion, and synchro transmitter control means to set the heading of the "simplane" wheel.

3. An automatic controller comprising a pair of brackets, a gimbal ring rotatably supported by said brackets to provide an axis of rotation for the gimbal ring designated at its X'-axis, a cross member rotatably supported by said gimbal ring with the supporting axis of said cross member normal to said X'-axis of said gimbal ring to provide an axis of rotation for said cross member designated as its Y'-axis, a shaft rotatably journalled at an intermediate point on said cross member normal thereto, a globe portion rigidly attached to one end of said shaft in such a fashion that said shaft forms an axis of rotation for said globe which axis is designated as the Z-axis, means to rotate said shaft about said Z-axis, means to indicate the rotated portion of said shaft, means to counterbalance said globe portion, the intersection of said X'-, Y'- and Z-axes being at the spherical center of the globe, a "simplane" wheel positioned to contact the surface of said globe portion, means to rotate said "simplane" wheel at any set speed within a desired range to move the outer surface of said globe portion by friction drive between the "simplane" wheel and said surface, means to change the heading of the "simplane" wheel on the globe portion surface about an axis designated the V-axis, said V-axis passing through the spherical center of the globe and the point of contact of the "simplane" wheel with the surface of the globe portion, means connected to said globe portion and responsive to rotation thereof about the X'-axis of the automatic dome controller for indicating the rotated position of the globe portion about its X'-axis, means connected to said cross member responsive to rotation thereof about the Y'-axis of the automatic controller for indicating the rotated position of the globe portion about its Y'-axis, and means responsive to change of angular position of the "simplane" wheel on said globe portion on the V-axis to indicate said angular position of the "simplane" wheel on the globe.

4. An automatic controller comprising a pair of brackets, a first gimbal ring rotatively supported by said brackets about an axis of rotation for said first gimbal ring designated as its X'-axis, a cross member rotatively supported by said first gimbal ring about a supporting axis for said cross member normal to said X' of the first gimbal ring to provide an axis of rotation for said cross member designated as its Y'-axis, a shaft journalled for rotation about an axis at an intermediate position in the length of said cross member, a globe portion rigidly attached to one end of said shaft to provide an axis of rotation for said globe portion concentric to the axis of said shaft which axis is designated the Z-axis, the intersection of said X'-, Y'- and Z-axes being at the spherical center of said globe portion, means to rotate said shaft about said Z-axis, means connected to indicate the rotated position of said shaft, a counterweight supported by said shaft to balance the weight of said globe portion, a sector gear, a synchro transmitter having a casing attached to the end of said shaft opposite the end of the shaft which is attached to said globe portion, said syncho transmitter having a rotor attached to a said sector gear, a "simplane" wheel positioned to contact the outer surface of said globe portion, means connected to rotate said "simplane" wheel for causing rotation of the globe portion under the wheel, means connected to change the heading of the "simplane" wheel, the axis of rotative adjustment of said "simplane" wheel in changing the heading thereof being designated as the V-axis, said V-axis passing through the spherical center of the globe portion and through the point of contact between the surface of the globe portion and the "simplane" wheel, synchro transmitter means connected to the "simplane" wheel and responsive to indicate the heading of the wheel on said globe portion about said V-axis, synchro transmitter means connected on the V-axis and to said sector gear for indicating the displacement of the center of the surface of the globe portion which constitutes the Z-axis from the point of contact with the "simplane" wheel which is on said V-axis, synchro transmitter means connected to the sector gear to measure the rotated position of the shaft of the synchro transmitter which is rotated by the sector gear, synchro-transmitter means connected for response to rotation of said globe portion about said X'-axis to indicate the rotated position of said globe about its X'-axis, and synchro transmitter means connected for response to rotation of said gimbal ring about the Y'-axis of the globe portion to indicate the rotated position of the globe portion about its Y'-axis.

References Cited in the file of this patent

UNITED STATES PATENTS

| | | |
|---|---|---|
| 2,266,741 | Crane et al. | Dec. 23, 1941 |
| 2,364,539 | Link | Dec. 5, 1944 |
| 2,389,142 | Esval et al. | Nov. 20, 1945 |
| 2,420,048 | Marsh | May 6, 1947 |